United States Patent
DiMarzio et al.

Patent Number: 6,069,843
Date of Patent: May 30, 2000

[54] OPTICAL PULSE INDUCED ACOUSTIC MINE DETECTION

[75] Inventors: Charles A. DiMarzio, Cambridge; Stephen W. McKnight, Needham; Scott C. Lindberg, Brighton, all of Mass.

[73] Assignee: Northeastern University, Boston, Mass.

[21] Appl. No.: 09/140,931

[22] Filed: Aug. 27, 1998

Related U.S. Application Data

[60] Provisional application No. 60/057,725, Aug. 28, 1997.

[51] Int. Cl.$^7$ ................................................. G01S 15/00
[52] U.S. Cl. ............................................................ 367/128
[58] Field of Search ................................ 367/128; 89/1.13; 342/22; 250/492.1

[56] References Cited

U.S. PATENT DOCUMENTS

| | | |
|---|---|---|
| 3,713,156 | 1/1973 | Pothier . |
| 3,953,822 | 4/1976 | Vilkomerson . |
| 4,052,666 | 10/1977 | Fletcher et al. .......................... 324/58.5 |
| 4,275,741 | 6/1981 | Edrich . |
| 4,407,292 | 10/1983 | Edrich . |
| 4,458,945 | 7/1984 | Ayler et al. ................................. 299/2 |
| 4,627,442 | 12/1986 | Land . |
| 4,653,855 | 3/1987 | Birnbach et al. ......................... 350/163 |
| 4,655,086 | 4/1987 | Mielnicka-Pate et al. ............... 73/646 |
| 4,773,298 | 9/1988 | Tischer ...................................... 89/1.13 |
| 4,775,028 | 10/1988 | de Heering ............................... 181/124 |
| 4,794,395 | 12/1988 | Cindrich et al. ......................... 342/424 |
| 4,937,580 | 6/1990 | Wills .......................................... 342/22 |
| 4,991,149 | 2/1991 | Maccabee ................................. 367/128 |
| 5,123,144 | 6/1992 | Demuth et al. .......................... 19/65 A |
| 5,454,048 | 9/1995 | Davis ........................................ 382/281 |
| 5,646,907 | 7/1997 | Maccabee ................................. 367/128 |
| 5,945,592 | 8/1999 | Chou ........................................ 73/24.01 |

*Primary Examiner*—Daniel T. Pihulic
*Attorney, Agent, or Firm*—Weingarten, Schurgin, Gagnebin & Hayes LLP

[57] ABSTRACT

An underground object detector can locate and identify the shape of underground objects using a pulsed laser to generate acoustic waves in soil. A remotely located microphone detects an acoustic signal between the soil surface and subsurface objects. The amplitude of this acoustic signal is correlated with the position of the laser beam source and output on a visual display, resulting in an acoustic map of the ground. A raster scanning of the suspect ground in the vicinity reveals the shape of the underground object, allowing the operator to discriminate benign and natural objects.

16 Claims, 5 Drawing Sheets

OPTICAL PULSE INDUCED ACOUSTIC MINE DETECTION

CROSS REFERENCE TO RELATED APPLICATIONS

This application claims priority to U.S. provisional patent application No. 60/057,725 entitled Optical Pulse Induced Acoustic Mine Detection, filed Aug. 28, 1997 and incorporated herein by reference.

STATEMENT REGARDING FEDERALLY SPONSORED RESEARCH OR DEVELOPMENT

Partial funding under U.S. Department of Defense contract No. DAAG55-97-1-0013 was provided for the invention disclosed herein.

BACKGROUND OF THE INVENTION

Acoustic sensing of underground objects has typically been performed with low frequency waves from widely separated sources. These wavelengths are too long to reliably image underground land mines. High-frequency acoustic or ultrasound waves are difficult to couple into the ground from the air. It is difficult or impossible to get conventional ground contact acoustic sources close to the mine position without risking detonation.

Further, all existing mine detection systems are subject to high rates of false alarms. Ground penetrating radar for example, a common method of mine detection, tends to locate all submerged objects, and does not discriminate sufficiently based on the shape or composition of the located object. In a tactical environment, such an area is likely to contain such objects as battle debris, spent shell casings, and containers from supplies and foodstuffs. Metal detectors, another common detection mechanism, detect all benign and harmful metal objects, and are also blind to plastic and ceramic mines. As typical prior art methods do not adequately report the shape of a submerged object, all objects so found must be suspected as a possible mine. An estimated 300 holes are dug for each live mine actually recovered. Such a low frequency of offending objects tends to promote carelessness, thereby having an overall detrimental effect on the mine detection operation. It would be beneficial to employ a mine detection operation which can provide shape resolution of a submerged object to allow discrimination of benign shapes. It would be further beneficial to employ a mine detection operation which can be performed remotely through a medium which will not cause detonation of a live, submerged mine, and which allows sensing equipment to remain a safe distance from the sensing area.

BRIEF SUMMARY OF THE INVENTION

The purpose of the invention is to detect, locate, and identify the shape of underground objects such as mines, buried waste, or utilities. A pulsed laser beam is used to generate acoustic waves in soil. A remotely located acoustic microphone detects an acoustic signal between the soil surface and shallow subsurface objects. The amplitude of this acoustic signal is correlated with the position of the laser beam source and output on a visual display, resulting in an acoustic map of the ground under examination. A raster pattern scanning of the suspect ground in the vicinity of a potential mine reveals the shape of the underground object, allowing the operator to discriminate benign and natural objects, such as rocks, from the recognizable shape of land mines.

BRIEF DESCRIPTION OF THE SEVERAL VIEWS OF THE DRAWING

The invention will become more fully understood from the following detailed description taken in conjunction with the accompanying drawings in which.

DETAILED DESCRIPTION OF THE INVENTION

A mine detection operation as defined by the present invention involves scanning a target area with a laser beam to produce detectable acoustic signals indicating position and depth of submerged matter.

Laser pulses generate audible sound, particularly on striking fibrous targets, such as the ground surface. Since IR light from such pulses is strongly absorbed in the first few microns of most solids, sound is produced by local heating and cooling of the ground caused by corresponding expansion and contraction. The result is a localized acoustic source that can be rapidly and repeatedly scanned over an area of ground without danger of detonating land mines. Acoustical signals propagate readily in soil and can be sensed with a remote microphone at or near the ground surface. For additional mobility, the microphone can be mounted on a rolling contact so that measurements could be taken in motion. Alternatively, a laser vibrometer may be used which can be scanned to effectively function as several microphones in different locations. A shallow subsurface object in combination with the ground surface will create a resonant structure which will amplify the acoustic response.

It should be noted that some skilled in the art refer to ground propagated waves as seismic waves and air propagated waves as acoustic waves. The present application uses the terminology acoustic waves to denote waves which propagate through the ground as a result of laser excitation and which can be detected with a audio sensor such as a microphone at or proximate to the ground surface.

Figure 1:
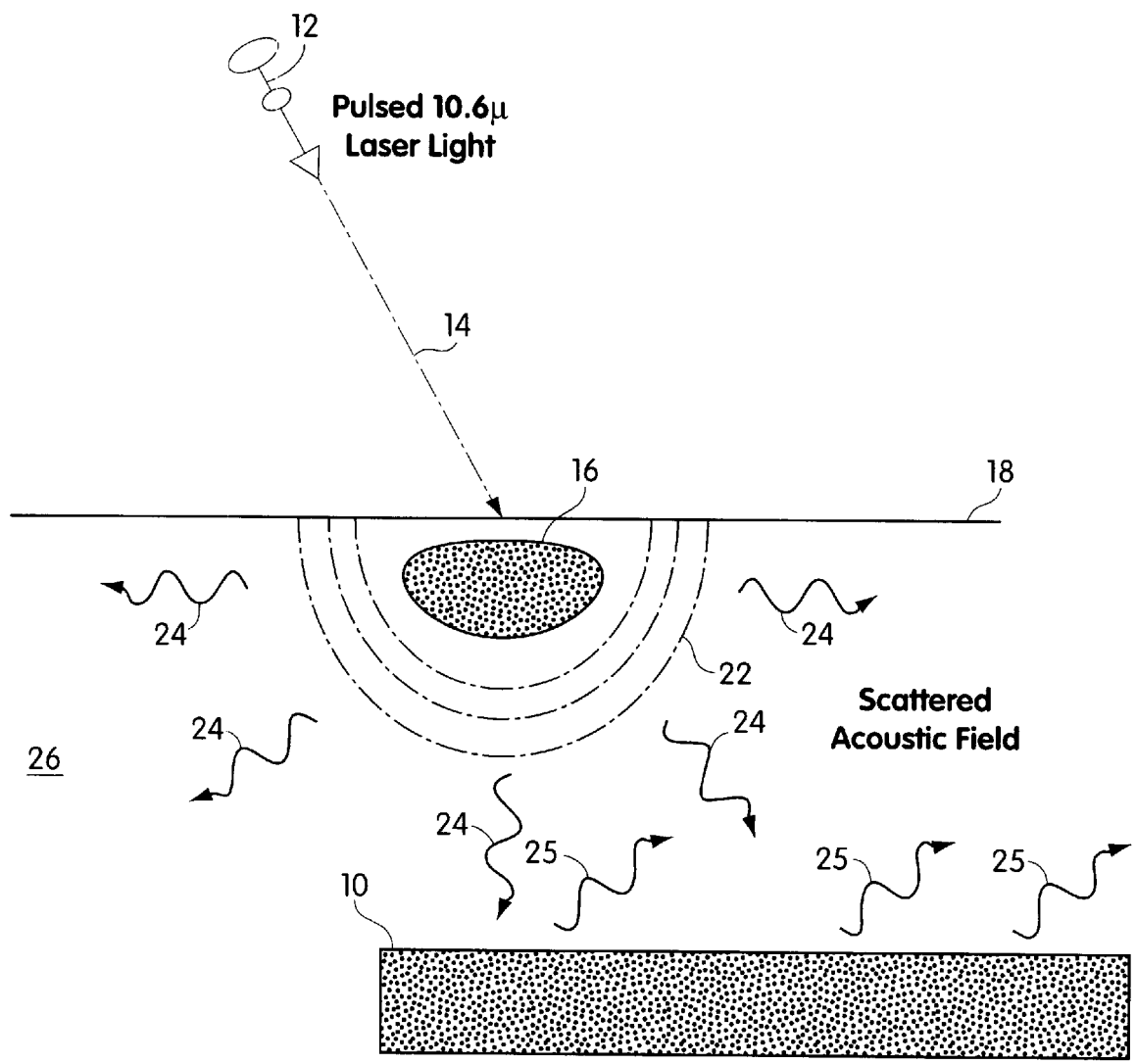
FIG. 1 is a side view of a laser source striking a target surface.

Referring to FIG. 1, laser-generated acoustic signal propagation is shown as reflected from a submerged object 10. A laser source 12 emits a beam 14 at a target area 16 on the ground surface 18. Such a beam 14 does not penetrate the ground surface 18, but rather causes localized heating and expansion at the target area 16. This heating causes compression waves 22 to produce source acoustic signals 24 which propagate through the ground 26. A submerged object 10 in the ground 26 will reflect the source acoustic signals 24 as acoustic response signals 25. These acoustic response signals indicate the depth of the submerged object 10 because the time required for the acoustic response signal to propagate from the object 10 varies with this depth.

Figure 2:
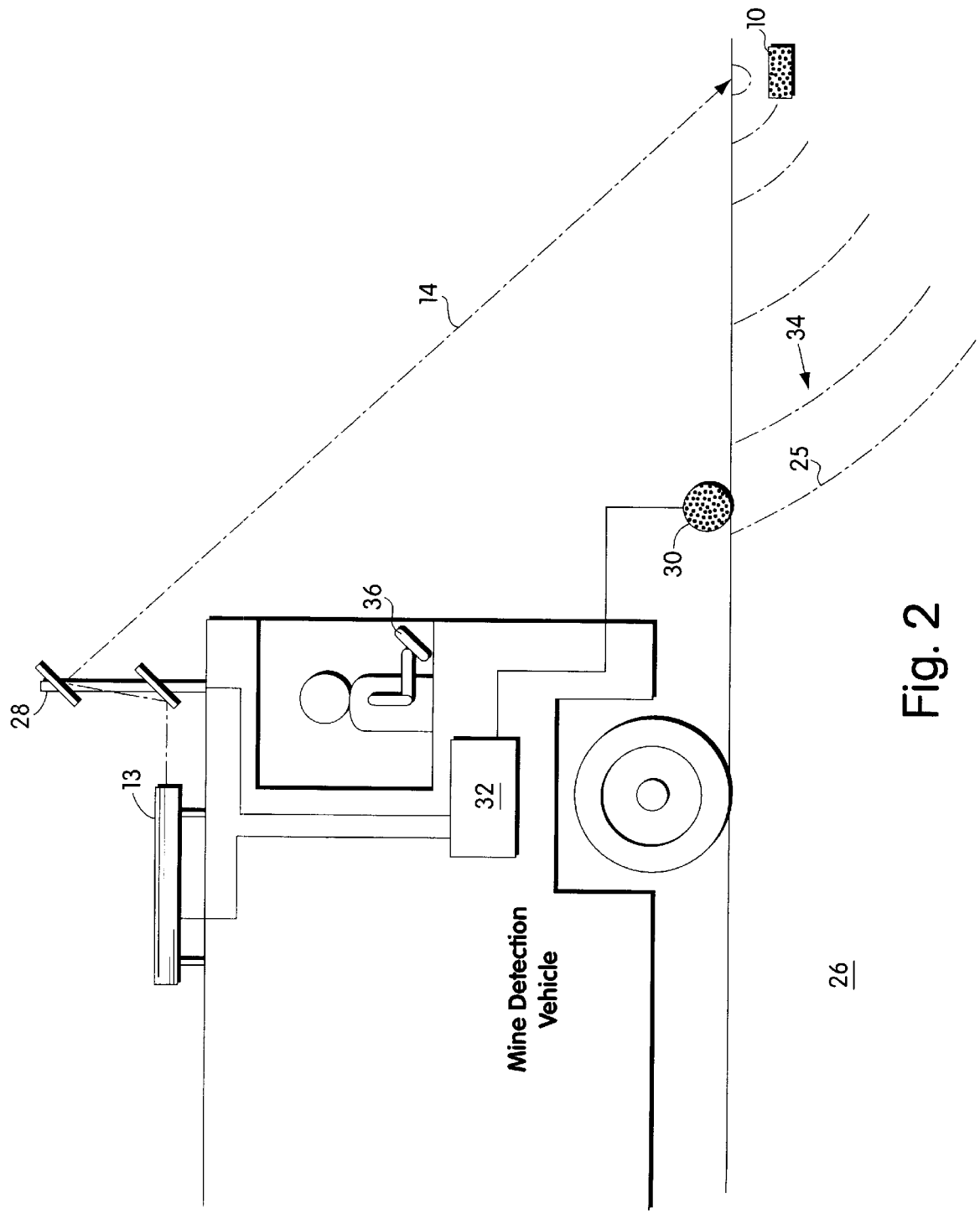
FIG. 2 is a side view of a laser detection apparatus as defined herein.

Scanning patterns of a high granularity can therefore produce an accurate set of measurements to ascertain the continuity and depth of such a submerged object 10. Referring to FIGS. 1 and 2, the laser-generated acoustic signals are used to detect a submerged object 10. A scanner 28 is used to focus the laser systematically in a raster pattern over the ground 26 to be cleared. Source acoustic signals 24 are generated from the initial excitation of the ground 18 surface. Microphone 30 receives both the source acoustic signals 24 and the acoustic response signals 25 reflected from submerged object 10. A control circuit 32 controls scanner 28 position and beam 14 pulsing, and receives source acoustic signals 24 and acoustic response signals 25 through microphone 30. The differential between the time of receipt of the source acoustic signals 24 and the acoustic response signals therefore indicates the depth. The control circuit 32 therefore correlates scanner 28 position, timing of the acoustic source signals 24, timing of the acoustic response signals 25, and propagation speed 34 of the acoustic signals to ascertain depth and position of the submerged object 10 and produce output display 36.

In effect, locating the underground mine is accomplished in the same way as a carpenter locates building studs by tapping on the wall and listening to the sound—without the danger of detonating the mine. The concept described above was tested in the Optical Sciences Laboratory at Northeastern University. The output of a pulsed $CO_2$ laser at a wavelength of 10.6 μm was directed onto a 300 cm$^3$ irregularly-shaped 0.425 kg sample of Idaho clay soil. An audio microphone was partially embedded into the soil sample and the microphone signal displayed on an oscilloscope screen. The laser power was approximately 50 mJ/pulse with a repetition rate of 50 Hz. The laser pulse width was 250 ns, providing essentially an impulse acoustic excitation.

For a subsurface object at a depth of α=10 cm, for example, a resonant frequency would be around 10 kHz, assuming a fundamental resonance with λ=2α and a velocity of sound in soil of 2000 m/s. By setting an electronic filter to select frequencies between 2 and 50 kHz, resonances for objects from 2–50 cm deep would be detected.

Figure 3:
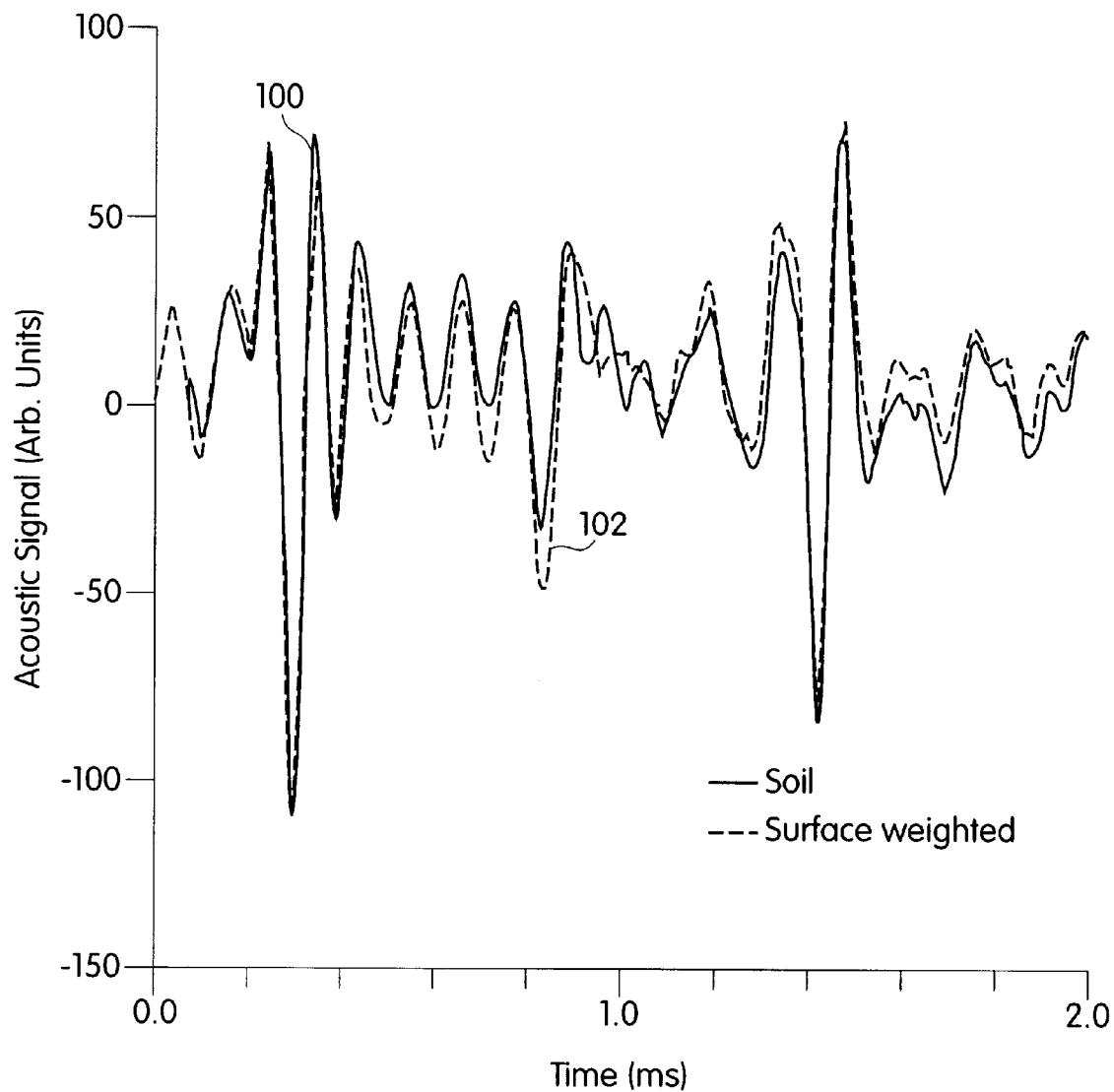
FIG. 3 is a graph of acoustic signals as produced by the present invention.

The dimensional acoustic resonance signal were clearly apparent in the oscilloscope trace. This acoustical response signal 100 as recorded on a PC analog-to-digital interface card is shown in FIG. 3. The primary frequency is near 10 kHz, in agreement with our expectation for resonance in this 7×7×6.5 cm sample. The modification of the acostic signal 102 is caused by surface weighting the soil sample with a 30 gm mass. The measurable modifications of the acoustical signal, particularly near 1 ms, indicate a sensitivity to even very small objects.

In alternative embodiments, additional signal information may be employed, such as a third signal reflected from the bottom of the submerged object, or more detailed information about time history, such as spectral information indicating resonance.

Figure 4A:
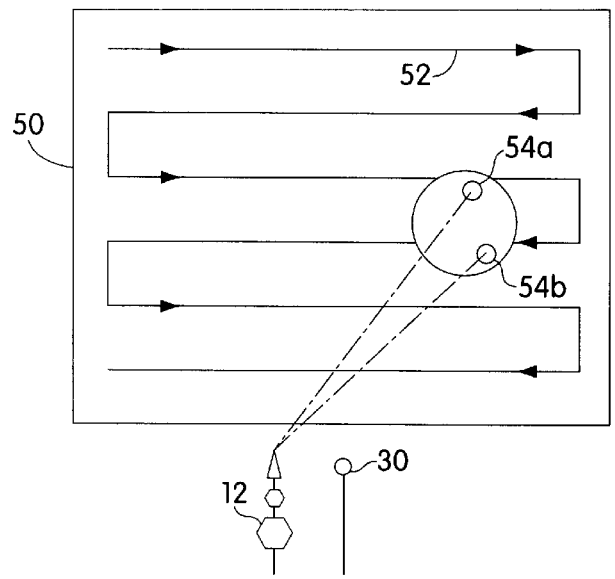
FIG. 4*a* is a top view of the scanning method as described herein.
Figure 4B:
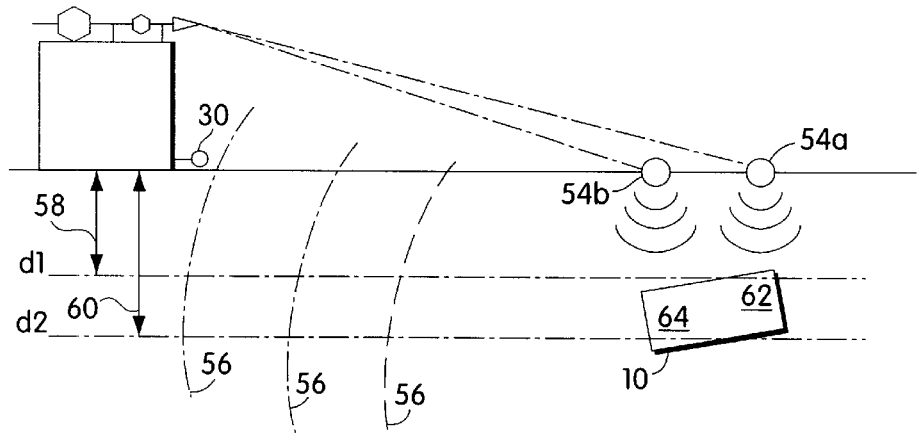
FIG. 4*b* is a side view of the scanning method of FIG. 4*a*.
Figure 4C:
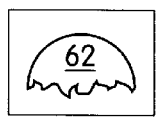
FIG. 4*c* is the display of a portion of a submerged object produced by the present invention.
Figure 4D:
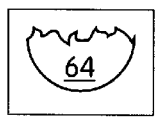
FIG. 4*d* is another display of a portion of a submerged object produced by the present invention.

Further detail with respect to shape resolution is described below with respect to FIGS. 4a–4d. Laser 12 scans an area 50 to be cleared according to raster pattern 52. A series of target areas 54a, 54b are irradiated. At target area 54a, acoustic response signals 56 are detected by microphone 30 at a propagation time corresponding to depth d1 58, denoting shallow side 62 of submerged object 10. On the next pass of the scan, target area 54b results in acoustic response signals 56 being detected at a propagation time corresponding to depth d2 60, denoting the deep side 64 of submerged object 10. These acoustic response signals 56 are processed to produce display image 62', corresponding to a scan at depth d1 58 (FIG. 4c), and display image 64', corresponding to a scan at depth d2 60 (FIG. 4d). Such signals taken from a series of target points can be stored by the control circuit as a series of ground elements, each denoting signals from a particular target point. This series can be arranged in a sequence of display frames, each denoting a particular depth. At a particular depth, the ground elements can be used to generate display elements representing the shape and mass of the object. Measurements stored from a series of target points can therefore be shown in a display image depicting a number of ground elements, each representing different, adjacent, target points.

Figure 5:
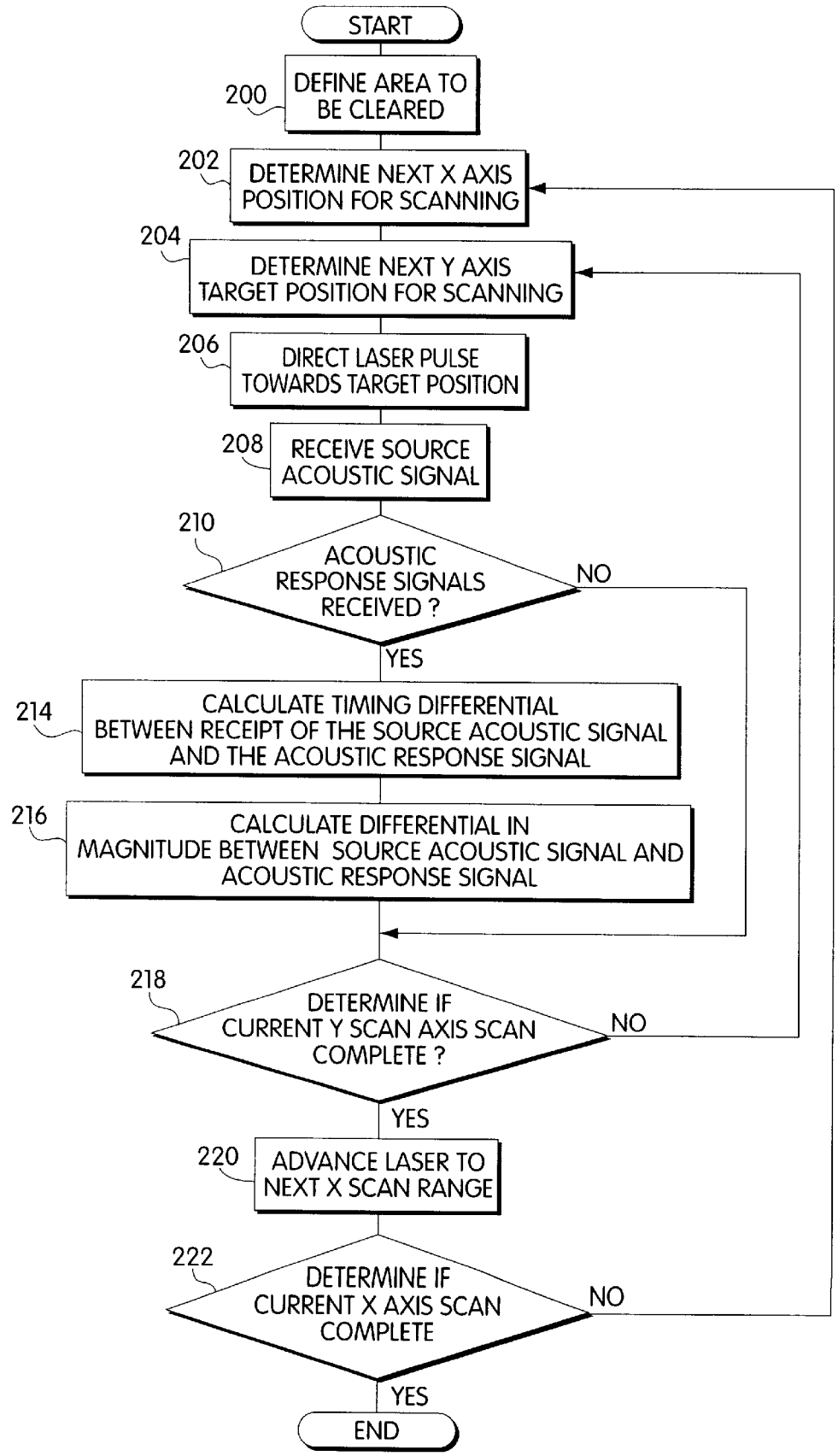
FIG. 5 is a flowchart of the method used to detect mines as defined herein.

Referring to FIG. 5, a flowchart of the method used to examine an area to be cleared is shown. The scan of the ground area proceeds in a two dimensional raster fashion, and will be denoted as X and Y axis. Timing between receipt of the source acoustic signal and the acoustic response signal indicates depth, and will be referred to as the Z axis. At 200, an area to be cleared is defined. At 202, the next X axis position is chosen for scanning. At 204, the next Y target position is chosen on the current X axis. At 206, a laser pulse is directed towards the target position to excite the ground. At 208, the source acoustic signal is received from the laser excitation. At 210, acoustic response signals are reflected off a submerged object (if present). At 212, a check is made to determine if acoustic response signals were received. If an acoustic response signal was received, step 214 calculates the depth of the submerged object based on the timing differential between receipt of the source acoustic signal and the acoustic response signal, thereby indicating the Z axis of the submerged object. At step 216, the mass of the submerged object is computed based on the differential in magnitude between the source acoustic signal and the received acoustic response signal. At step 218, a check is made to determine if the current Y scan has reached the edge of the area. If so, the laser is advanced to check the next X scan range at step 220, otherwise the next Y target position is chosen at step 204. At step 222, the current X scan position is examined to see if the X limit has been reached, and control reverts to step 202 to scan the next X axis until the limit is reached.

A detailed survey of the submerged objects over a large area can therefore be produced. As the shape resolution of submerged objects is improved when a high granularity of target areas is provided, a scan utilizing finely tuned increments of target areas and response signal timing will yield a highly detailed rendition of submerged objects.

As various extensions and modifications will be apparent to those skilled in the art, the foregoing invention is not intended to be limited except as defined by the following claims.

We claim:

1. A laser driven acoustic underground object detector comprising:

a laser source having a beam;

a scanner connected to said laser source and adapted to direct said beam over a predetermined area;

an acoustic sensor operative to receive a plurality of acoustic signals produced when said beam is directed at said area;

a control circuit having a differentiator connected to said laser, said scanner and said acoustic sensor; and said differentiator operable to compute a diffential between said plurality of acoustic signals.

2. The underground object detector of claim 1 wherein said laser is operative to produce a periodic pulse in response to said control circuit.

3. The underground object detector of claim 2 wherein said control circuit is adapted to receive through said acoustic sensor a first acoustic signal and a second acoustic signal produced by said periodic pulse to determine a timing differential between said first acoustic signal and said second acoustic signal.

4. The underground object detector of claim 3 wherein said control circuit is adapted to receive a third acoustic signal, said acoustic signal produced by said periodic pulse and reflected to said acoustic sensor.

5. The underground object detector of claim 3 wherein said control circuit is adapted to direct said scanner to a predetermined point in the area.

6. The underground object detector of claim 5 wherein said control circuit is operative to direct said periodic pulse over a series of predetermined points in the area by said scanner.

7. The underground object detector of claim 6 wherein said control circuit is adapted to store a ground element including:

a magnitude of said first acoustic signal;

a magnitude of said second acoustic signal; and said timing differential;

for each of said predetermined points.

8. The underground object detector of claim 7 wherein said control circuit further includes an output display, said display adapted to produce a series of display frames, each of said display frames having display elements representing said ground elements wherein said display frames and said display elements are ordered as a function of said timing differential, said magnitude of said first acoustic signal, and said magnitude of said second acoustic signal.

9. The underground object detector of claim 1 wherein said laser source is a $CO_2$ laser.

10. The underground object detector of claim 1 wherein said beam has a wavelength of about 10.6 micrometers.

11. The underground object detector of claim 2 wherein said periodic pulse has a duration of about 100 nanoseconds.

12. The underground object detector of claim 6 wherein said series of predetermined points comprise a raster pattern.

13. A method of detecting underground objects comprising the steps of:

directing a laser pulse at a ground area;

receiving a first acoustic signal produced by said laser pulse;

receiving a second acoustic signal produced by said laser pulse;

determining the time differential between receiving said first acoustic signal and receiving said second acoustic signal.

14. The method of claim 13 wherein said first acoustic signal has a magnitude and said second acoustic signal has a magnitude and further comprising the step of determining the differential between said magnitude of said first acoustic signal and said magnitude of said second acoustic signal.

15. The method of claim 14 further comprising the steps of:

defining an area to be scanned for underground objects;

defining a series of predetermined points within said area;

directing a laser pulse at each of said predetermined points;

storing in a series said timing differential and said magnitude differential after said determining step.

16. The method of claim 15 further comprising the step of displaying an image of said series of said timing differential and said magnitude differential after said storing.

* * * * *